United States Patent

[11] 3,624,295

[72] Inventor Carl Norman Pederson
Westmont, Ill.
[21] Appl. No. 778,973
[22] Filed Nov. 26, 1968
[45] Patented Nov. 30, 1971
[73] Assignee The Pioneer Electric & Research Corporation
Forest Park, Ill.

[54] MONITORING MEANS FOR TELEGRAPH-TYPE DATA-COMMUNICATIONS SYSTEMS
9 Claims, 1 Drawing Fig.

[52] U.S. Cl. .......... 178/69 G
[51] Int. Cl. .......... H04l 25/02
[50] Field of Search .......... 178/69, 69 G; 179/2 R, 175.2 C; 307/294; 328/78

[56] References Cited
UNITED STATES PATENTS
3,045,210 7/1962 Langley .......... 340/150
3,400,378 9/1968 Smith et al. .......... 179/2
3,317,668 5/1967 Johnsen .......... 178/69

*Primary Examiner*—Kathleen H. Claffy
*Assistant Examiner*—Douglas W. Olms
*Attorney*—A. J. De Angelis

ABSTRACT: In a telegraph-type data-communications system in which a plurality of data sending stations are polled sequentially by a master controller to transmit data, a monitor in the test room of the system supervises the activity of the controller. An absence of polling signals for a predetermined time is detected and reported visually and/or audibly via remote and local alarm means, as desired. The monitoring circuit is transistorized and functions with a sudden switching action at a stable operating point with relatively inexpensive components, notwithstanding the relatively long time constant (slow rate) of its timer.

PATENTED NOV 30 1971 3,624,295
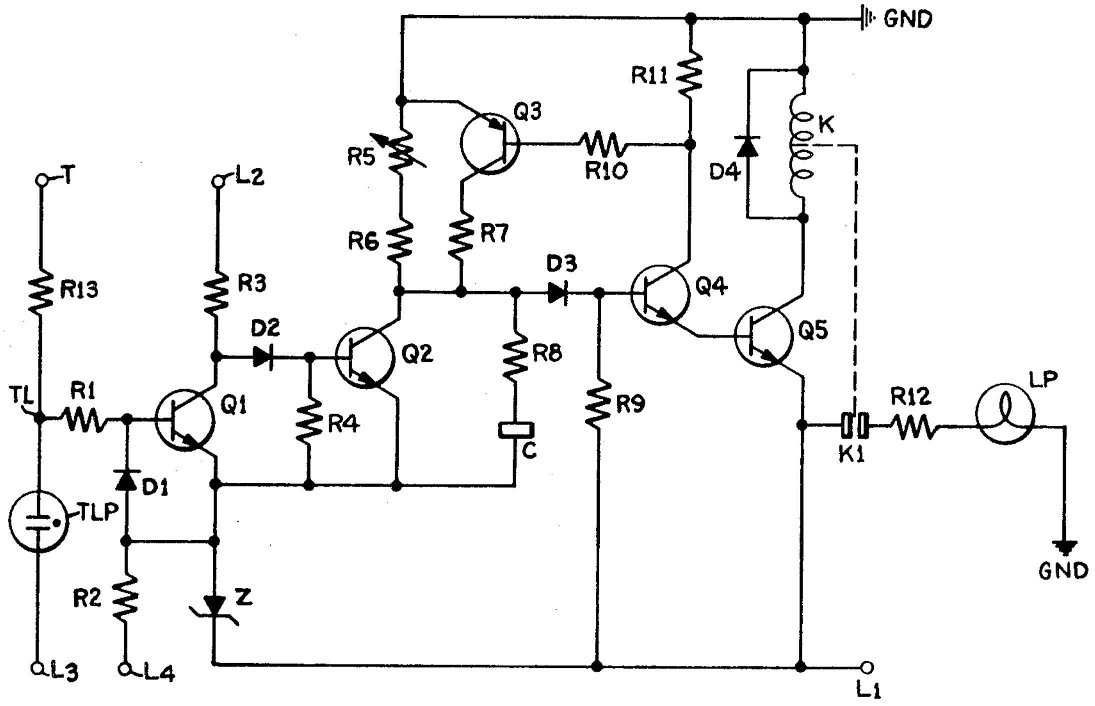
CARL N. PEDERSON *INVENTOR.*
*BY* [signature]
*ATTORNEY.*

MONITORING MEANS FOR TELEGRAPH-TYPE DATA-COMMUNICATIONS SYSTEMS

The invention relates to data-communication systems using telegraph type signals and, more particularly, to means for monitoring the activity of such systems.

In present day data-communication systems using telegraph-type signals, data to be transmitted is often stored at a sending station for subsequent transmission to a receiving station as the communication facilities become available. Normally, a plurality of sending stations are interconnected through the communication system to a "master" station which receives the data. The master station is equipped with a controller which sequentially polls the sending stations to initiate transmission of the stored data by each station successively. When polled, a station, if it has data to send, responds by transmitting the stored data by coded combinations of telegraph-type mark and space signals. If the polled station has no data to send, it so indicates to the receiving (master) station which then polls the next sending station in the system and so on.

Such data communication systems are under the surveillance of plant personnel located at what may be termed a "test center" through which all communications are directed for monitoring purposes. It is desirable that such plant personnel be quickly appraised of the failure of automatic polling mechanism of a master station for efficient operation of the communications system and to insure service to data-transmitting customers.

It is, therefore, desirable to provide means which respond to a lack of polling activity in a communications system for a predetermined time and report such lack promptly and accurately.

It is also desirable that the length of the inactivity period being measured be adjustable to suit the individual message transmitting characteristics of each system being monitored. For example, in most systems the duration of message transmission from each polled station does not exceed 2 ½ minutes. In some systems transmission is effected in less than 1 ½ minutes. It has, thus, been found satisfactory to provide monitoring means adjustable to recognize a lack of polling activity of from 2 ½ minutes to 1 ½ minute duration, as the case may be.

However, a transistorized timer measuring such a relatively long time of from 1 ½ to 2 ½ minutes approaches its "time out" point at a relatively very slow rate. This very slow approach to the "threshold" of operation causes the operating point of the monitoring mechanism to be inconsistent. This instability of operation is undesirable as it sometimes results in false reports and consequent unnecessary attention from the test room and maintainence personnel.

It is, therefore, an object of the invention to provide monitoring and reporting means for a data-transmission system of the telegraph-signal-type, which means differentiate between normal intervals between message transmission in the system and substantially long intervals of inactivity indicating a malfunction of the message polling controller.

It is a further object to provide such monitoring and reporting means which measures a relatively long time interval of inactivity and yet maintains a stable operating point.

It is another object to provide such a monitoring and reporting means which is relatively inexpensive, uses a minimal power, is simple to construct and maintain and which is readily adjustable to measure different time periods of inactivity in the system.

It is a further object to provide such a monitoring and reporting means which is positively reset upon each occurrence of polling activity in the system.

In carrying out the invention according to a preferred embodiment, alarm mechanism is provided in the test center of a communications system, which mechanism is energizable by the closing of relay contacts. The relay is energized by the output of a transistorized switching circuit which includes amplification. This transistorized switching circuit is actuated in response to the "timing out" of a resistor-capacitor timing circuit. The timing circuit measures the interval during which there fails to be a "space" signal from the polling master controller to a sending station of the system. Means are provided for detecting "marking" and space signals from the master controller. Detected marking signals cause the detector to initiate operation of the timer. Detection of a space signal automatically and positively resets the timing means preventing actuation of the transistorized switch to alarm condition. Once an alarm condition has been initiated, the first space signal detected by the detecting means resets the timer and erases the alarm condition, indicating that polling has resumed.

Stability of the operating point of the monitoring and reporting means is provided by means which sense the approach of the transistorized switching means to their threshold of operation. Such sensing means then drives the transistorized switch to switch suddenly to alarm condition. Such sudden switching action of the transistorized switch is provided by a variable impedance, comprising a transistor, interconnected to shunt the resistive portion of the resistor-capacitor timing circuit. This shunting transistor is connected to sense the switching threshold and then be driven to conduit heavily. This places a low-impedance shunt path across the timing resistor, decreasing the timing in the order of magnitude of 20. The monitoring means, thus, provides a stable operating point in time of the switch to consistently measure a regular time interval under conditions of system inactivity while providing a sufficiently long enough time for the usual transmission of messages and normal sequential polling of the system stations. Such sudden action of the switching means permits the utilization of less expensive, smaller and lower power rated transistors.

Features and advantages of the invention will be seen from the above, from the following description of the preferred embodiment when considered in conjunction with the drawing and from the appended claims.

The drawing is a simplified schematic wiring diagram of monitoring and reporting mechanism for a telegraph-type communication system for surveillance of polling of individual stations of the system from a master controller, and embodies the invention.

In the wiring diagram transistors are generally designated Q, resistors R, capacitors C and diodes D with numeral suffixes being added to differentiate similar components one from the other. Z designates a zener diode. Ground connections are designated GND, while power supply lines are designated L with numeral suffixes added to distinguish the lines one from the other. Unidirectional power from any convenient source (not shown) is applied to the supply lines. For the preferred embodiment shown, −130 volts is applied to supply line L4, while −24 volts is applied to supply lines L1, L2, and L3. Terminal T receives mark signals at −50 volts and space signals at −130 volts from the master station controller (not shown), as it polls data-sending stations of the system being monitored. A neon gas lamp, generally designated TLP, is connected between a terminal TL and supply line L3 for energization through resistor R13 by the telegraph signals applied to terminal T.

A relay of the electromagnetic type having a coil and a pair of normally open contacts K1, as is indicated by the broken line, is provided to report an alarm condition. Diode D4 shunts relay coil K to allow decay of the coil flux field. Contacts K1, when closed, energize an alarm lamp LP through current-limiting resistor R12; lamp LP being located in the system test room for viewing by plant personnel. It is to be understood that, although the alarm indicator is shown as visual it may also be audible and may be remotely located, if desired. Alarm relay K is controlled by the transistorized circuitry to report a lack of polling activity in the system, as will now be described.

In one tested embodiment of the subject monitoring and reporting mechanism, transistors Q1, Q2, Q4 and Q5 were selected of the 2N3568-type, while transistor Q3 was selected of the 2N3644-type. Zener Diode Z was selected of the 975-type to provide voltage regulation. All other diodes were of the general purpose type. Capacitor C was selected at 72 microfarads, while resistors R5 and R6 were selected of 1 megaohm each and resistor R8 at 1 kilohm. With the selected values resistor R5 is adjustable to provide a timing interval of from 1 ½ to 2 ½ minutes of the mechanism timing means.

Transistors Q1 and Q2 with lamp TLP and their associated circuitry form input signal detecting means of the monitoring mechanism for detecting mark and space signals at terminal T as they are sent from the system polling station controller to the associated data sending stations. Polling intelligence comprises coded combinations of mark and space signals, each combination being unique to the station being polled.

Assume that a −130 volt spacing signal is applied to terminal T. Transistor Q1 is in nonconducting condition and transistor Q2 is in conducting condition. This is so since, under such conditions, lamp TLP is ionized by the voltage applied across it to yield approximately a 70-volt drop across it. With −24 volts at supply line L3, approximately −90 volts appears at interconnection point TL and through resistor R1 to the base of transistor Q1. This signal maintains transistor Q1 in nonconducting condition. With transistor Q1 in nonconducting condition, the signal applied to the base of transistor Q2 through resistor R3 and diode D2 causes transistor Q2 to conduct through its emitter-collector circuit. Transistor Q2 while conducting, places a low-impedance shunt path across capacitor C and resistor R8 of the RC timing circuit, which comprises resistors R5, R6, R8, and capacitor C. This shunt path maintains capacitor C in discharged condition, preventing initiation of timing by the timing means. This timing circuit times the predetermined interval during which the absence of any spacing signal at terminal T indicates the lack of polling intelligence from the polling station. Resistor R5 is adjustable to vary the time interval being measured as is required. Under conditions where capacitor C is discharged, transistor Q3 is also maintained in nonconducting condition.

Transistors Q4 and Q5 comprise output switching means. With the assumed presence of a spacing signal at terminal T to maintain capacitor C discharged, transistor Q4 is in nonconducting condition as is its output amplifier transistor Q5. Relay K, whose coil is in the emitter-collector circuit of transistor Q5, therefore remains in unactuated condition to maintain its contacts K1 open, indicating that the master controller is polling the sending stations.

Next assume that during polling a marking signal of −50 volts now replaces the spacing signal at terminal T. Under such conditions lamp TLP is extinguished, placing −50 volts at the base of transistor Q1, thereby driving it to conduction through its emitter-collector circuit. Transistor Q1, upon conducting, causes a sufficiently negative voltage signal to be applied to the base of transistor Q2 with respect to its emitter to drive it to nonconducting condition. Transistor Q2, upon becoming nonconducting, removes the aforementioned low-impedance shunt path across capacitor C and resistor R8 of the timing circuit, enabling capacitor C to start charging through resistors R5, R6, and R8. This initiates the measuring of a timing interval at the expiration of which interval capacitor C will have charged sufficiently to drive transistor Q4 to conducting condition. For purposes of this example, assume that the timing circuit components have been selected and the value of resistor R5 adjusted to provide the relatively long timing interval of 2 ½ minutes.

Next assume that, as polling intelligence continues to be monitored at the test center, a spacing signal next appears at terminal T. Under such conditions, lamp TLP again ionizes, causing transistor Q1 to return to nonconducting condition, while transistor Q2 is again driven to conduct, as was previously described. This reapplies the aforementioned low-impedance shunt path across capacitor C, discharging the capacitor quickly through resistor R8 and the emitter-collector circuit of transistor Q2, terminating timing by the timing means.

Next assume that a mark signal again appears at terminal T, causing the aforementioned operation of transistors Q1 and Q2, resulting in charging action of capacitor C to initiate timing of the 2 ½ minute interval. Further assume that no space signal appears at terminal T from the polling station for the predetermined timing period of 2 ½ minutes, the marking signal being maintained at terminal T. Under such conditions, capacitor C slowly approaches its charged level, indicating the absence of polling activity in the system for the predetermined 2 ½ minute interval. As capacitor C reaches this charged level it applies sufficient potential to the base of transistor Q4 of the switching means with respect to its emitter to drive the transistor to start conducting. Transistor Q4 starts to conduct at this threshold of time expiration slowly increasing the signal it applies to the base of amplifying transistor Q5. Transistor Q5, under such circumstances starts to conduct, causing current flow through coil K of the alarm relay. When transistors Q4 and Q5 conduct sufficiently, relay K operates, closing its contacts K1, thereby causing energization of alarm lamp LP. Lamp LP lites indicating to the test station personnel that there is an absence of polling activity in the system being monitored; so that inquiry and corrective procedures may be promptly initiated.

The operation of transistor Q3 causes the sudden switching of output transistor Q4 and its amplifying transistor Q5 to "-pull-in" relay at a stabilized operation point in time, thereby providing a regular predetermined time interval and obviating false alarms, as will now be explained. Transistor Q3 senses the approach by capacitor C to the end of its timing interval by reacting to the start of conduction in switching transistor Q4. As capacitor C approaches the charged level sufficient to initiate conduction of transistor Q4, current starts to flow through resistor R11 in the emitter-collector circuit of transistor Q4. Such current flow drives transistor Q3 to conduct heavily through its emitter-collector circuit including resistor R7, thereby shunting timing resistors R5 and R6 to quickly charge capacitor C fully. This immediately decreases the timing interval of the resistor-capacitor circuit for the tested preferred embodiment by the order of 20. The full charge of capacitor C is, thus, quickly, applied to the base circuit of transistor Q4, causing the transistor (and in turn transistor Q5) to attain quickly full conduction. This provides the desired sudden-switching action of the switching transistors Q4, Q5 to pull-in relay K at a stable operating point, while measuring the relatively long time intervals required in communication systems being monitored for polling of data-sending stations. This sudden-switching operation permits the utilization of an amplifying transistor Q5 of less expense, smaller size and lower power rating.

Next assume that a spacing signal of approximately −130 volts again appears at terminal T, indicating that polling has resumed. As was previously described, this causes transistor Q1 to return to nonconducting condition, while transistor Q2 conducts, indicating the presence of a spacing signal at terminal T and providing a low impedance shunt path across capacitor C. Capacitor C quickly discharges through transistor Q2, causing transistors Q3, Q4 and Q5 to return to nonconducting condition. As transistor Q5 returns to nonconducting condition alarm relay K is deenergized sufficiently to release and reopen its contacts K1, interrupting the energizing circuit of alarm lamp LP. Lamp LP goes out, indicating to the test station personnel that polling activity in the system being monitored has resumed.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. In a telegraph-type data-communication system having a plurality of stations selectively transmitting data to a master station upon request therefrom, monitoring and reporting means for detecting the absence of requests from the master station to said selected sending stations for data transmission and in response to such detection reporting such condition, said monitoring and reporting means comprising, detecting means responsive to interrogations of said stations from said master station for data transmission, said detecting means in the absence of such interrogations being actuated from a first condition to a second condition, timing means responsive to operation of said detecting means to said second condition for (initiating) timing (of) a predetermined interval, switching means responsive to (said timing) the approach of said timing means to the end of said predetermined interval for starting operation (switching) from a first switch condition to a second switch condition (at the expiration of a said predetermined interval), and indicating means responsive to switching of said switching means to said second switch condition for indicating said absence of interrogation for said predetermined interval, characterized in that:

means are provided for sensing (the threshold) said starting operation of switching means to said second switch condition (of said switching means) for causing termination of said predetermined interval by said timing means and ("-snap") sudden actuation of said switching means to said second switched condition.

2. Monitoring and reporting means as set forth in claim 1 wherein, said detecting means respond to any interrogation from said master station by being actuated back to said first condition, said detecting means in said first condition positively resetting said timing means to zero timing.

3. In a telegraph-type data-communication system as set forth in claim 1 wherein said master station interrogates said sending stations selectively by coded combinations of mark and space signals, wherein said detecting means are actuated to said second condition by said mark signals for initiating timing by said timing means, and wherein said detecting means upon detecting a space signal are restored to said first condition for restoring said timing means to zero.

4. Monitoring and reporting means as set forth in claim 3 wherein said timing means comprise resistor-capacitor timing network means and, wherein said detecting means include a variable impedance responsive to detection of a space signal for placing a low-impedance shunt path across said capacitor of said timing network for discharging said capacitor.

5. Monitoring and reporting means as set forth in claim 4 wherein said variable impedance of said detecting means, under conditions where a mark signal is detected, removes said low-impedance shunt path across said timing capacitor for allowing charging of said capacitor to initiate said timing.

6. Monitoring and reporting means as set forth in claim 4 wherein said variable impedance means of said detecting means comprises a transistor with its emitter-collector path shunting said timing capacitor.

7. Monitoring and reporting means as set forth in claim 5 wherein said switching means comprise a pair of slaved transistors a first one of which, under conditions where said capacitor of said resistor-capacitor timing network attains a predetermined charge, becomes conducting, and wherein its said associated slaved transistor amplifies such conduction.

8. Monitoring and reporting means set forth in claim 7 wherein said threshold-sensing means comprise a transistor connected to said switching means for sensing the threshold of conduction of said first switching means transistor, said threshold-sensing transistor, upon sensing initiation of conduction of said first switching means transistor, being driven quickly to full conduction and being connected with its emitter-collector path shunting a portion of the resistance of the resistor-capacitor timing network for quickly charging said timing capacitor causing sudden conduction of said switching transistors.

9. Monitoring and reporting means set forth in claim 7 wherein, said indicating means comprise an electromagnetic relay connected for energization in the emitter-collector circuit of said second of said switching transistors, and wherein, alarm means are provided and energized by operation of said relay.

* * * * *

UNITED STATES PATENT OFFICE
CERTIFICATE OF CORRECTION

Patent No. 3,624,295 Dated November 30, 1971

Inventor(s) Carl Norman Pederson

It is certified that error appears in the above-identified patent and that said Letters Patent are hereby corrected as shown below:

Column 1, line 52, correct the spelling of "maintenance"; column 2, line 23, "conduit" should read -- conduct --; column 4, line 27, after "relay" insert --K --; column 5, lines 11, 13, 15, 16, 17, 22, 24, 25 and 26, delete the words in parentheses.

Signed and sealed this 1st day of May 1973.

(SEAL)
Attest:

EDWARD M.FLETCHER,JR.
Attesting Officer

ROBERT GOTTSCHALK
Commissioner of Patents